United States Patent [19]
Carlini

[11] Patent Number: 5,570,753
[45] Date of Patent: Nov. 5, 1996

[54] MOTORCYCLE ENGINE AND TRANSMISSION TORQUE-RESISTING ARM

[76] Inventor: Anthony J. Carlini, 5 Geneve, Newport Beach, Calif. 92660

[21] Appl. No.: 411,166

[22] Filed: Mar. 27, 1995

[51] Int. Cl.⁶ .............................. B62K 11/04; B62M 7/02
[52] U.S. Cl. .......................... 180/219; 180/291; 180/294; 180/300; 74/606 R
[58] Field of Search ................................... 180/219, 228, 180/291, 294, 298, 300; 74/606 R, 607

[56] References Cited

U.S. PATENT DOCUMENTS

| | | | |
|---|---|---|---|
| 4,805,717 | 2/1989 | Trema | 180/219 |
| 4,809,800 | 3/1989 | Suzuki | 180/219 |
| 4,828,069 | 5/1989 | Hatsuyama | 180/219 |
| 5,012,883 | 5/1991 | Hiramatsu | 180/219 X |
| 5,248,012 | 9/1993 | Kurawaki et al. | 180/219 |

*Primary Examiner*—Anne Marie Boehler
*Assistant Examiner*—F. Zeender
*Attorney, Agent, or Firm*—Roy A. Ekstrand

[57] ABSTRACT

A motorcycle utilizes a support frame upon which an engine and transmission are supported in an in-line front to back relationship. The engine and transmission cases are coupled by a primary engine case on one side. A torque resisting arm configured to be fitted to the opposite sides of the engine and transmission cases from that which the primary engine case occupies is secured to underlying faces of the engine case and transmission case to provide a torque resisting member therebetween. The torque resisting arm includes a generally planar engine attachment plate configured to be received upon the engine case and a generally planar spanning plate configured to be received upon the transmission case. The torque resisting arm further defines an offset wall and curved wall extending between the engine attachment plate and the spanning plate.

8 Claims, 2 Drawing Sheets

MOTORCYCLE ENGINE AND TRANSMISSION TORQUE-RESISTING ARM

FIELD OF THE INVENTION

This invention relates generally to motorcycle engine and transmission support systems and particularly to those in which the engine and transmission are separately housed and operatively interconnected upon a common motorcycle frame.

BACKGROUND OF THE INVENTION

Motorcycles have for many decades proven to be an extremely popular and useful mode of transportation as well as a source of enjoyment sport and amusement among a wide variety of users and motorcycle enthusiasts. Such motorcycles are usually two-wheeled and often high powered and extremely colorful and are provided in a virtually endless variety. Further variations have been provided in three-wheeled motorcycles, two-wheeled motorcycle supported side cars as well as two or three-wheeled motorcycles pulling trailers. Despite the availability of such variants, however, the basic two-wheeled motorcycle is, by far, the most popular and pervasive type of cycle.

As would be expected, this popularity has prompted practitioners in the art to provide substantial variations of motorcycles themselves. For example, engine size, power and cylinder number have varied from simple one cylinder lower power engines to higher powered multiple cylinder engines having two, four or six cylinder engines. Engine power has also been provided in dramatic variations making available motorcycles which range from simple lower powered basic transportation to exotic high speed, high power performance cycles. The cycle itself also varies substantially in style, seating arrangement, ride characteristics and weight. Thus, cycles have been provided in which the rider sits virtually upright in a fully upright seated position often accommodating a passenger behind the rider and, in streamline-type performance cycles, in which the rider is virtually horizontal upon the cycle.

Despite this great variation of motorcycles, however, most two-wheeled motorcycles are fabricated of the same basic components and subsystems. The frame is usually formed largely of tubular metal such as steel or higher strength lightweight material to support a pivotable front fork assembly which supports a front wheel and handlebars used for steering and a rear wheel suspension usually providing a movable swing arm and suspension coupled to the frame. The frame includes an arced set of frame members which span the distance between the front and rear wheel suspensions and which usually support the fuel tank and rider seat. In addition, the space between the front and rear wheel suspensions usually includes a number of frame members which extend downwardly in a generally U-shaped arrangement to support the engine, transmission and the coupling apparatus by which the engine drives the transmission. A coupling drive such as a drive chain and sprocket arrangement is usually coupled between the transmission and the rear wheel to drive the cycle.

One of the most pervasive motorcycle types developed by practitioners in the art is manufactured and sold by the Harley-Davidson Company. In these popular cycles, the engine usually a V-twin is supported upon the lower frame portion just behind the front wheel while a multispeed transmission is supported behind the engine upon the same frame portion. Engine power is coupled to the transmission by a drive chain and the transmission output is further coupled to the rear wheel by a drive chain and sprocket arrangement or belt and pulleys. A rigid case enclosure generally referred to as the primary engine case extends between the engine and transmission and provides a rigid attachment therebetween.

The objective in the fabrication of the frame and drive components of a motorcycle such as the Harley-Davidson motorcycle is the provision of a solid substantially rigid strong combination. However, despite the need for strength and rigidity in such cycles, care must also be taken to avoid excessive weight which diminishes the appeal and performance of the cycle. In addition, the engine and transmission are resiliently mounted within resilient engine and transmission supports upon the supporting frame members to reduce undesired vibration and noise. As a result, despite the best efforts of cycle designers, substantial twisting or torquing of frame and suspension members occurs during operation of such motorcycles. For example, under power, substantial torquing force is generated between the engine and transmission. This torque is resisted in the Harley-Davidson type motorcycle by the rigid primary engine case which is securely attached therebetween. Further torquing occurs due to suspension travel particularly during sharp high speed turns which further exacerbates the problem.

There arises, therefore, a need in the art for providing further stabilization of the engine and transmission intercoupling without unduly adding weight to the cycle or diminishing performance.

SUMMARY OF THE INVENTION

Accordingly, it is a general object of the present invention to provide an improved torque-resisting element for use in the engine to transmission coupling of a motorcycle. It is a more particular object of the present invention to provide an improved torque resisting member for use in a motorcycle which avoids adding undue weight and which avoids diminishing the sound isolating and vibration dampening support of the engine and transmission.

In accordance with the present invention, there is provided for use in a motorcycle having a frame supporting an engine having an engine case, a transmission having a transmission case, a primary engine case securing the engine case to the transmission case, and drive means for driving the motorcycle coupled to the transmission, a torque-resisting arm comprising: an engine attachment plate defining a generally planar member having a first concave curved upper edge and a plurality of apertures formed therein; a spanning plate offset from the engine attachment plate and generally parallel thereto, the spanning plate defining a second concave curved rear edge and a plurality of apertures; and an offset wall extending between the engine attachment plate and the spanning plate, the torque-resisting arm being secured to the engine case and the transmission case by attaching the engine attachment plate to the engine case and the spanning plate to the transmission case whereby torque between the engine case and the transmission case is resisted.

BRIEF DESCRIPTION OF THE DRAWINGS

The features of the present invention, which are believed to be novel, are set forth with particularity in the appended claims. The invention, together with further objects and advantages thereof, may best be understood by reference to the following description taken in conjunction with the accompanying drawings, in the several figures of which like reference numerals identify like elements and in which:

DESCRIPTION OF THE PREFERRED EMBODIMENT

Figure 1:
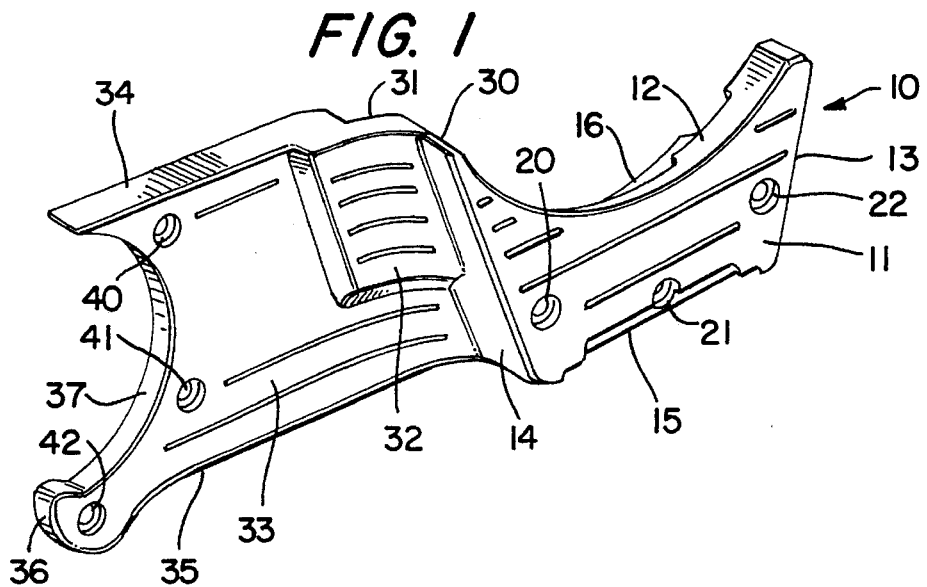
FIG. 1 sets forth a front perspective view of a torque resisting arm constructed in accordance with the present invention.

FIG. 1 sets forth a front perspective view of a motorcycle engine and transmission torque resisting arm constructed in accordance with the present invention and generally referenced by numeral 10. Torque resisting arm 10 is preferably fabricated of a high strength lightweight material such as aluminum or the like. Other material may be selected for fabrication of torque resisting arm 10 in accordance with the desired strength and weight requirements of a particular application. For example, torque resisting arm 10 may be fabricated of a lightweight high strength steel or other alloys such as stainless steel, magnesium aluminum alloys, or titanium alloys without departing from the spirit and scope of the present invention. Additionally, it may be desirable in certain applications to fabricate arm 10 of a nonmetal such as a high strength ceramic or the like. Arm 10 is fabricated as a single integral member and may be cast, forged, or machined from a single metal billet.

Figure 3:
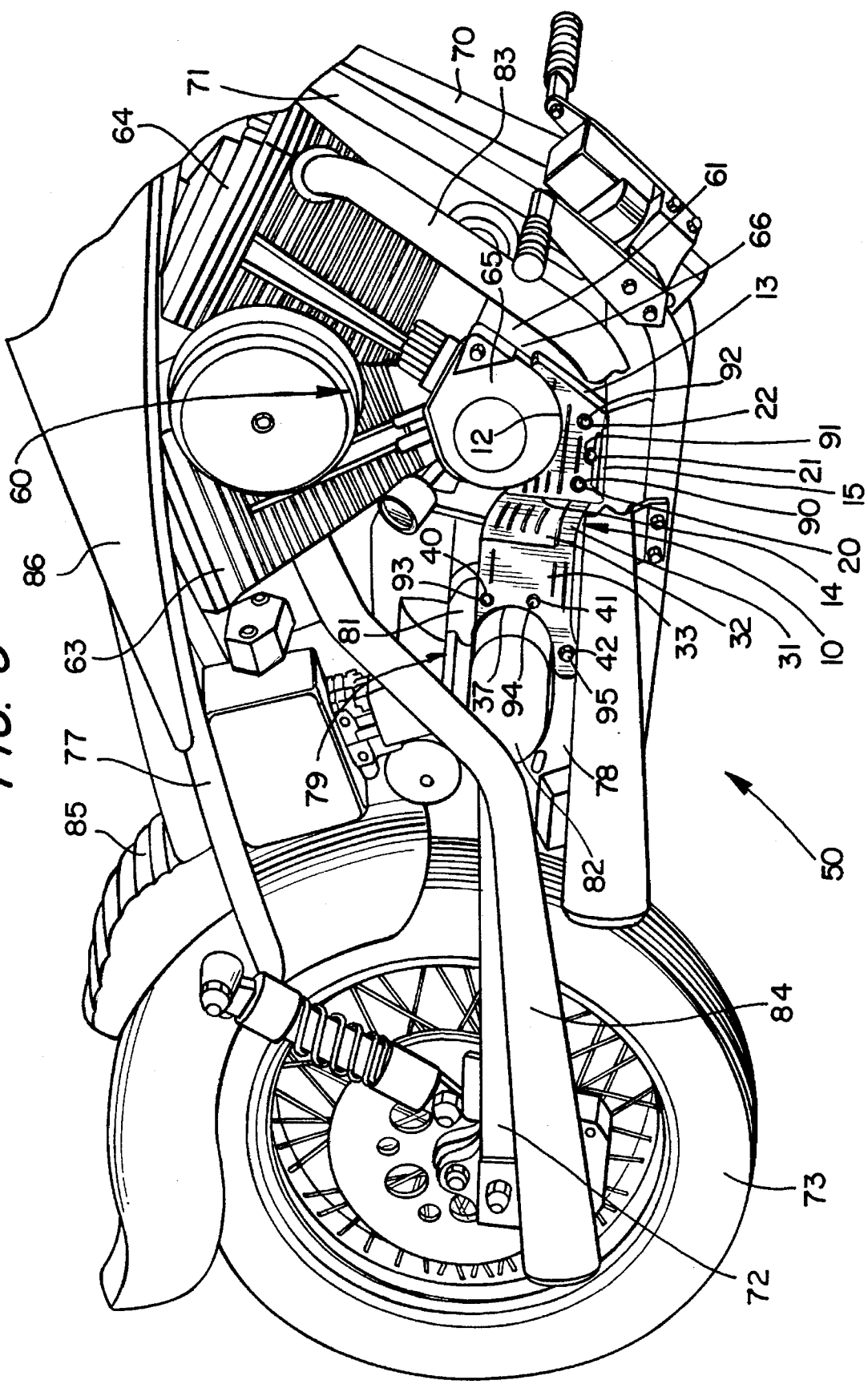
FIG. 3.sets forth a partial perspective view of a motorcycle having the present invention torque resisting arm secured thereto.

More specifically, arm 10 defines a generally planar engine attachment plate 11 having an angled front edge 13, a bottom edge 15 and an angled rear edge 14. In addition, engine attachment plate 11 defines a concave curved edge 12. A plurality of apertures 20, 21 and 22 are formed within engine attachment plate 11 and as is better seen in FIG. 3 are spaced in accordance with the position of the underlying crank case bolts such as bolts 90, 91 and 92 seen in FIG. 3 to facilitate attachment of engine attachment plate 11 to the host motorcycle engine crank case. Torque resisting arm 10 further includes an offset wall 30 supporting rear edge 14 and extending inwardly therefrom to provide an offset support for a generally planar spanning plate 33. A curved wall portion 31 provides a smooth transition between offset wall 30 and spanning plate 33. An increased thickness strengthening portion 32 is formed upon curved wall 31 and extends between offset wall 30 and spanning plate 33 to provide increased strength and rigidity for torque resisting arm 10. Spanning plate 33 defines a top edge 34 and a bottom edge 35 as well as a curved edge 37. An end extension portion 36 is formed at the end of spanning plate 33 between curved edge 37 and bottom edge 35. End extension 36 defines an aperture 42 while spanning plate 33 defines apertures 40 and 41 adjacent curved edge 37. As is better seen in FIG. 3, apertures 40, 41 and 42 are spaced in accordance with the underlying transmission case bolts 93, 94 and 95 respectively. As is described below in greater detail, bolts 93 through 95 are used to securely attach spanning plate 33 to transmission case 81 (seen in FIG. 3).

Thus, torque resisting arm 10 is carefully configured to meet the spatial relationships between the mating surfaces of the engine crank case and transmission case of the host motorcycle. Curved edges 12 and 37 are designed to provide sufficient clearance with respect to extending portions of the host motorcycle crank case end housing and transmission case end housing while maximizing the effective contact area of torque resisting arm 10. Offset wall 30 and curved wall 31 provide correct orientation for the offset mating surfaces of the host motorcycle engine and transmission cases. Strengthening portion 32 reinforces curved wall 31 and a portion of offset wall 30 as well as spanning plate 33 to further rigidify and strengthen torque resisting arm 10. As a result, arm 10 is precisely configured to correspond to the host motorcycle and provide a maximum of strength and attachment thereto.

Figure 2:
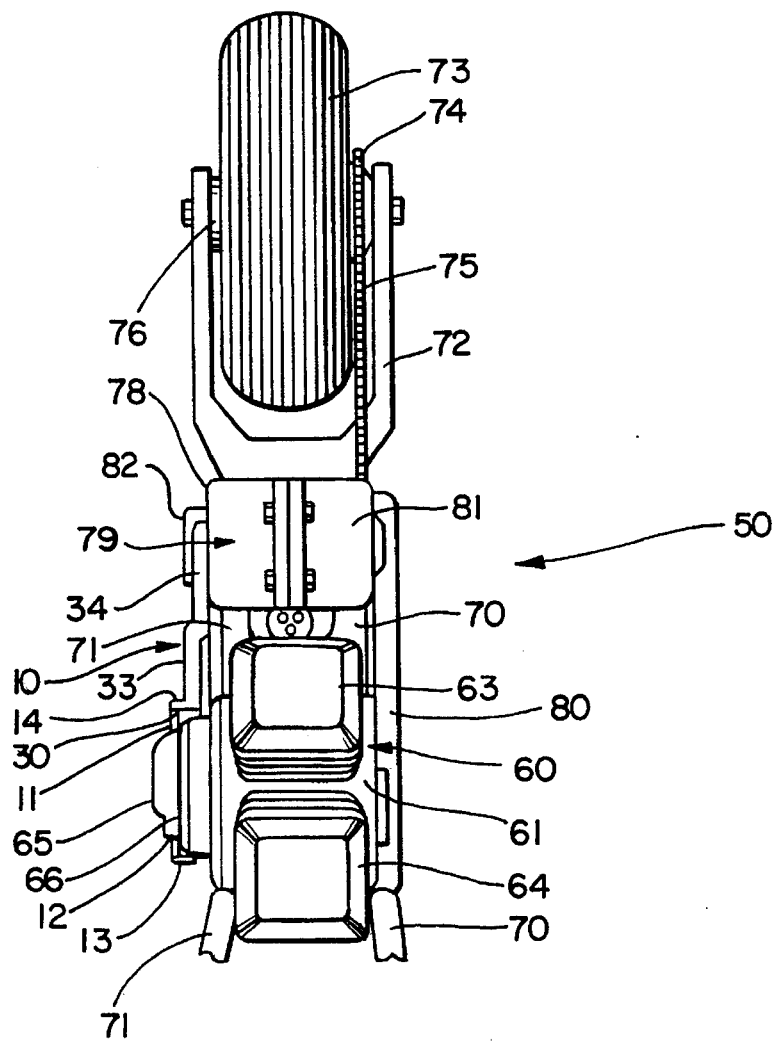
FIG. 2 sets forth a partial top view of a motorcycle having the present invention torque resisting arm secured thereto.

FIG. 2 sets forth a partial top view of a motorcycle generally referenced by numeral 50 having torque resisting arm 10 secured thereto. For purposes of illustration of the attachment of torque resisting arm 10, a number of components of motorcycle 50 are omitted from FIG. 2. Thus, in accordance with conventional fabrication techniques, motorcycle 50 includes a pair of frame members 70 and 71 extending rearwardly beneath an engine 60 and a transmission 79. Motorcycle 50 further includes a rearwardly extending swing arm 72 which in accordance with conventional fabrication techniques (not shown) is pivotally secured to frame members 70 and 71. A rear axle 76 rotatably supports a rear wheel 73 upon swing arm 72. A rear sprocket 74 is coupled to rear wheel 73 in accordance with conventional fabrication techniques. A drive chain 75 is coupled between transmission 79 and rear sprocket 74 in further accordance with conventional fabrication techniques.

Engine 60 is entirely conventional and includes a crank case 61 supporting a plurality of front cylinders 64 and a plurality of rear cylinders 63 in a V-cylinder arrangement. Crank case 61 further includes an outwardly extending end housing 65. While not seen in FIG. 2, crank case 61 is further coupled to frame members 70 and 71 using vibration absorbent or resilient engine mounting apparatus which may be entirely conventional. Similarly, transmission 79 includes a transmission case 81 which in turn is resiliently supported upon frame members 70 and 71 to provide a vibration absorbing and isolating attachment in accordance with conventional fabrication techniques not shown in FIG. 2. A primary engine case 80 extends between crank case 61 and transmission case 81 and provides a rigid attachment therebetween. Primary engine case 80 is rigidly secured to crank case 61 and transmission case 81. Motorcycle 50 described thus far is fabricated entirely in accordance with conventional fabrication techniques. In accordance with the present invention, a torque resisting arm 10 is secured between crank case 61 and transmission case 81 to provide an additional secure attachment therebetween not provided by primary engine case 80. In further accordance with the present invention, torque resisting arm 10 is configured to accommodate the offset arrangement of face 66 of crank case 61 and face 78 of transmission case 81.

More specifically, torque resisting arm 10 includes an engine attachment plate 11 received upon face 66 of crank case 61. As described above, engine attachment plate 11 defines a curved edge 12 which as can be seen in FIG. 2 and as is better seen in FIG. 3 extends beneath end housing 65 of crank case 61. Engine attachment plate 11 defines an angled front edge 13 and an angled rear edge 14. Attachment plate 11 is secured to face 66 of crank case 61 by a plurality of bolts 90 through 92 passing through apertures 20 through 22 respectively as is seen in FIG. 3. Torque resisting arm 10 extends rearwardly from crank case 61 and defines an offset wall 30 from which a generally planar spanning plate 33 extends to face 78 of transmission case 81. Torque resisting arm 10 is secured to face 78 of transmission case 81 using a plurality of bolts 93 through 95 (seen in FIG. 3).

In operation, torque-resisting arm 10 provides secure attachment between engine crank case 61 and transmission case 81 which complements the secure attachment of primary engine case 80. As a result, a rigid high strength attachment is provided between engine crank case 61 and transmission case 81 which resists the above-described torque forces which would otherwise be sustained and resisted entirely by primary engine case 80. Further, the use of torque resisting arm 10 secures engine 60 and transmission 79 to form a rigid integral combination which may be nonetheless resiliently supported upon frame members 70 and 71 to minimize vibration but which resists torquing between the engine and transmission. As a result, the stress upon primary engine case 80 caused by swing arm 72 and drive torque exerted by engine 60 upon transmission 79 is avoided. Torque resisting arm 10 is configured to provide a maximize surface area contact upon face 66 of crank case 61 and face 78 of transmission case 81 thereby maximizing the security of attachment.

FIG. 3 sets forth a partial perspective view of motorcycle 50 having torque resisting arm 10 secured thereto. As described above, motorcycle 50 but for the addition of torque resisting arm 10 may be fabricated entirely in accordance with conventional fabrication techniques. Thus, motorcycle 50 includes frame members 70 and 71 extending beneath and supporting engine 60 and transmission 79 using conventional sound and vibration absorbing mounting apparatus (not shown). Engine 60 includes a plurality of front cylinders 64 and a plurality of rear cylinders 63 having respective exhaust pipes 83 and 84 coupled thereto. Motorcycle 50 further includes a rearwardly extending spring arm 72 and a rear wheel 73. Motorcycle 50 also includes a frame member 77 extending above engine 60 and transmission 79 and supporting a fuel tank 86 and a seat 85. Engine 60 includes a crank case 61 having an outwardly extending end housing 65 and defining a face 66. Correspondingly, transmission 79 includes a transmission case 81 defining a face 78 and supporting an outwardly extending transmission end housing 82.

In accordance with the present invention, a torque resisting arm 10 defines an engine attachment plate 11 having a front edge 13 and a rear 14 together with a bottom edge 15 and a curved upper edge 12 is secured to face 66 of crank case 61. As described above, torque resisting arm 10 defines a plurality of apertures 20, 21 and 22 which are positioned in correspondence with the pattern of crank case bolts on face 66 of crank case 61. Accordingly, the present invention torque resisting arm is secured to face 66 of crank case 61 by removing the existing crank case bolts beneath attachment plate 11 and thereafter placing bolts 90, 91 and 92 through apertures 20 through 22 respectively and securing attachment plate 11 to face 66. It may be desirable to utilize bolts 90, 91 and 92 having slighter greater length than the existing bolts previously within crank case 11 to compensate for the thickness of attachment plate 11. A similar operation is carried forward upon transmission case 81 as the transmission case bolts beneath spanning plate 33 of torque resisting arm 10 are removed and thereafter bolts 93 through 95 are passed through apertures 40 through 42 respectively of spanning plate 33 to secure spanning plate 33 to transmission case 81. It may be desirable once again to utilize bolts 93 through 95 having slighter greater lengths that the existing transmission case bolts within transmission case 81 to compensate for the thickness of spanning plate 33. Once spanning plate 33 is secured to face 78 of transmission case 81 and attachment plate 11 is secured to face 66 of crank case 61, the attachment of torque resisting arm 10 is complete and motorcycle 50 may be operated realizing the benefits of the present invention torque resisting arm. It should be noted that torque resisting arm 10 is carefully configured to provide maximize strength and compatible fit with the existing engine and transmission cases of motorcycle 50. Thus, attachment plate 11 defines a curved edge 12 which is carefully configured to be received beneath and generally conformed to end housing 15. This maximizes the available contact area of torque resisting arm 10 against face 66. Similarly, spanning plate 33 defines a curved edge 37 which corresponds generally to the curvature of transmission end housing 82 and provides similar maximized contact area upon face 78 of transmission case 81.

What has been shown is a motorcycle and transmission torque-resisting arm which is attachable to the engine and transmission cases of a motorcycle to provide additional support between the engine and transmission without adding appreciable weight. The torque resisting arm shown complements the primary engine case attachment between the transmission and engine and aids in reducing the torque which would otherwise be placed upon and potentially damage the primary engine case. The torque resisting arm provided does not interfere with the resilient or vibration absorbing mounting apparatus for the engine and transmission. In addition, the torque resisting arm of the present invention adds a very small amount of weight while providing substantial strength. The configuration of the torque resisting arm avoids the need for reorienting or relocating components of the host motorcycle.

While particular embodiments of the invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention.

That which is claimed is:

1. For use in a motorcycle having a frame supporting an engine having an engine case, a transmission having a transmission case, a primary engine case securing said engine case to said transmission case, and drive means for driving said motorcycle coupled to said transmission, a torque-resisting arm comprising:

an engine attachment plate extending in a first plane defining a generally planar member having a first concave curved upper edge and a plurality of apertures formed therein;

a spanning plate extending in a second plane generally offset from said first plane and generally parallel thereto, said spanning plate defining a second concave curved rear edge and a plurality of apertures; and an offset wall connecting said engine attachment plate and said spanning plate and extending in a third plane generally at an angle to said first and second planes, said torque-resisting arm being secured to said engine case and said transmission case by attaching said engine attachment plate to said engine case and said spanning plate to said transmission case whereby torque between said engine case and said transmission case is resisted.

2. A torque-resisting arm as set forth in claim 1 wherein said engine case and said transmission case each define respective pluralities of attachment bolts and wherein said pluralities of apertures in said engine attachment plate and said spanning plate are aligned with and receive said attachment bolts.

3. A torque-resisting arm as set forth in claim 2 wherein said engine attachment plate, said offset wall, and said spanner plate are formed as a one-piece integral unit.

4. A torque-resisting arm as set forth in claim 3 wherein said offset wall further includes a curved wall extending between said offset wall and said spanning plate.

5. A torque-resisting arm as set forth in claim 4 further including a curved strengthening portion overlying said curved wall.

6. A torque-resisting arm as set forth in claim 5 wherein said engine attachment plate defines an angled front edge and an angled rear edge.

7. A torque-resisting arm as set forth in claim 6 wherein said engine case includes a first end housing and first surrounding face and wherein said engine attachment plate is secured to said first surrounding face and said first concave edge generally conforms to a portion of said first end housing.

8. A torque-resisting arm as set forth in claim 7 wherein said transmission case includes a second end housing and second surrounding face and wherein said spanning plate is secured to said second surrounding face and said second concave edge generally conforms to a portion of said second end housing.

* * * * *